(12) United States Patent
Yokomichi

(10) Patent No.: US 6,576,858 B1
(45) Date of Patent: Jun. 10, 2003

(54) SMALL HOLE ELECTRICAL DISCHARGE MACHINING METHOD AND SMALL HOLE ELECTRICAL DISCHARGE MACHINING APPARATUS

(75) Inventor: Shigeharu Yokomichi, Kanagawa-ken (JP)

(73) Assignee: Elenix, Inc., Kanagawa-ken (JP)

( * ) Notice: Subject to any disclaimer, the term of this patent is extended or adjusted under 35 U.S.C. 154(b) by 0 days.

(21) Appl. No.: 10/053,708

(22) Filed: Jan. 24, 2002

(51) Int. Cl.$^7$ .............................. B23H 1/00; B23H 7/30; B23H 7/36
(52) U.S. Cl. ................. 219/69.2; 219/69.14; 219/69.17
(58) Field of Search ........................ 219/69.14, 69.15, 219/69.17, 69.2

(56) References Cited

U.S. PATENT DOCUMENTS

| | | | |
|---|---|---|---|
| 4,705,932 A | * 11/1987 | Aso et al. .................... | 219/69.2 |
| 5,281,788 A | * 1/1994 | Abiko et al. ............. | 219/69.14 |
| 5,416,289 A | * 5/1995 | Tanaka .................... | 219/69.14 |
| 6,127,642 A | * 10/2000 | Gleason et al. .......... | 219/69.15 |
| 6,211,480 B1 | * 4/2001 | Nagata ..................... | 219/69.14 |
| 6,407,356 B1 | * 6/2002 | Lai .......................... | 219/69.14 |

OTHER PUBLICATIONS

U.S. application No. 10/108,425, by Ishiwata et al., filed Mar. 29, 2002.

* cited by examiner

*Primary Examiner*—Geoffrey S. Evans
(74) *Attorney, Agent, or Firm*—Greenblum & Bernstein, P.L.C.

(57) ABSTRACT

A small hole electrical discharge machining apparatus, including: a slide base; a Z axis slide freely positionable in a vertical direction, the Z axis slide being provided on the slide base; an electrode holding member for holding an upper portion of a stick-shaped or pipe-shaped electrode, the electrode holding member being provided on the Z axis slide so as to be freely rotatable; an electrode guiding member for guiding a lower portion of the electrode, the electrode guiding member being provided on the slide base; and an electrode motor for rotatively driving the electrode holding member, the electrode motor being provided on the Z axis slide. Moreover, the electrode holding member is provided with a jet nozzle for guiding the electrode by use of a water jet.

5 Claims, 6 Drawing Sheets

SMALL HOLE ELECTRICAL DISCHARGE MACHINING METHOD AND SMALL HOLE ELECTRICAL DISCHARGE MACHINING APPARATUS

BACKGROUND OF THE INVENTION

The present invention relates to a small hole electrical discharge machining method and a small hole electrical discharge machining apparatus.

FIG. 1 is a view showing one example of a related small hole electrical discharge machining apparatus 100. In the small hole electrical discharge machining apparatus 100, a processing vat 101 filled up with processing fluid is provided on an X-Y table 103, and a work W is fixed to a jig 105 in the processing vat.

Above the processing vat 101, a rotary spindle 109 having an electrode 107 attached thereto is provided on a machining head 111. The machining head 111 is provided so as to be freely moved in a vertical direction (Z axis direction) by a servomotor Mz. Moreover, the rotary spindle 109 is set to be rotatively driven by a motor Ms fixed to the machining head.

For example, when a small hole having a diameter of 0.2 mm or less is machined in the related small hole electrical discharge machining apparatus 100, as shown in FIG. 2, a reverse discharge has been heretofore made to be generated between a rather thick electrode material 113 and a metal block 115 to form an electrode portion 117 having a fine electrode diameter d in accordance with a diameter of a hole to be machined, and the electrode portion 117 has been used as an electrode.

SUMMARY OF THE INVENTION

However, a length l of the electrode portion 117 is limited to fifth to tenth times the diameter d of the electrode portion 117 due to a factor such as buckling and vibration of the electrode portion 117 during machining. Hence, in the discharge machining in which an electrode corrodes away, there is a problem that the number of holes which can be continuously machined is small.

Moreover, in fabricating the electrode portion 117 by the reverse discharge, since corrosion of the metal block 115 cannot be completely eliminated, it is essential to confirm a finished dimension of the electrode diameter d. For confirming the dimension, the electrode 107 is detached from the rotary spindle 109, and measurement thereof by use of a microscope and the like is repeated. Thus, the electrode portion is finished in a desired dimension. Therefore, productivity in the small hole electrical discharge machining is not enhanced.

The present invention was made in order to solve the problem as described above. An object of the present invention is to provide a small hole electrical discharge machining method capable of using a thin and long stick-shaped electrode, for which fabrication of an electrode tip thereof is not required, and a small hole electrical discharge machining apparatus having high productivity.

As means for achieving the above-described subjects, the small hole electrical discharge machining method of the present invention is a method for a small hole electrical discharge machining apparatus including an electrode holding member for holding an upper portion of a stick-shaped or pipe-shaped electrode, and an electrode guiding member for guiding a lower portion of the electrode. Moreover, the electrode holding member is provided with a jet nozzle for generating a water jet. The method is characterized in that the electrode is fed to a work while being rotated simultaneously when the electrode is guided by use of the water jet.

Moreover, a small hole electrical discharge machining apparatus of the present invention is characterized by including: a slide base; a Z axis slide freely positionable in a vertical direction, the Z axis slide being provided on the slide base; an electrode holding member for holding an upper portion of a stick-shaped or pipe-shaped electrode, the electrode holding member being provided on the Z axis slide so as to be freely rotatable; an electrode guiding member for guiding a lower portion of the electrode, the electrode guiding member being provided on the slide base; and an electrode motor for rotatively driving the electrode holding member, the electrode motor being provided on the Z axis slide. In the apparatus, the electrode holding member is provided with a jet nozzle for guiding the electrode by use of a water jet.

Moreover, in the small hole electrical discharge machining apparatus, the electrode guiding member is characterized by including: a guide unit provided with an electrode guide made of ceramics; a funnel for guiding the water jet to a center of the guide unit; and a splash preventing member for preventing splash of the water jet.

DESCRIPTION OF THE PREFERRED EMBODIMENT

Hereinafter, description will be made for an embodiment of the present invention with reference to the drawings.

Figure 1:
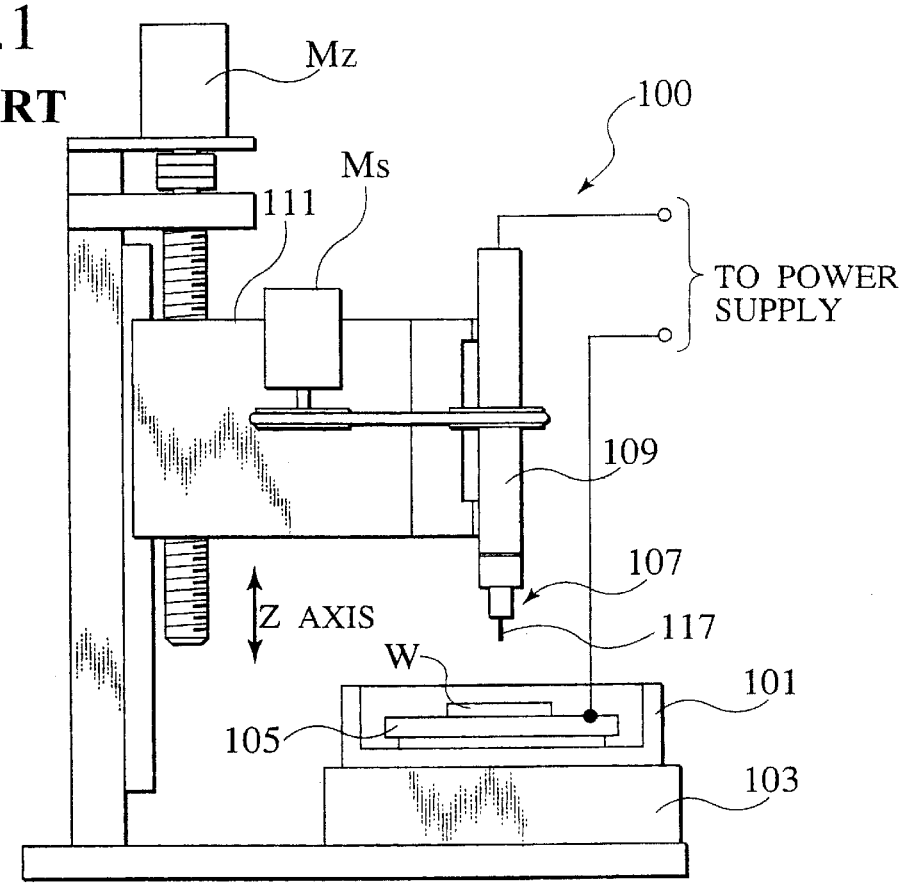
FIG. 1 is a view showing one example of a related small hole electrical discharge machining apparatus.
Figure 2:
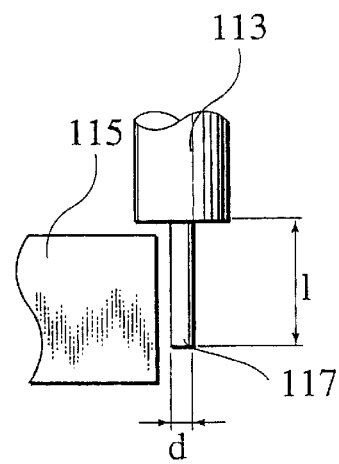
FIG. 2 is an explanatory view showing a shape of a fine electrode and a method of manufacturing the same in the related small hole electrical discharge machining apparatus.
Figure 3:
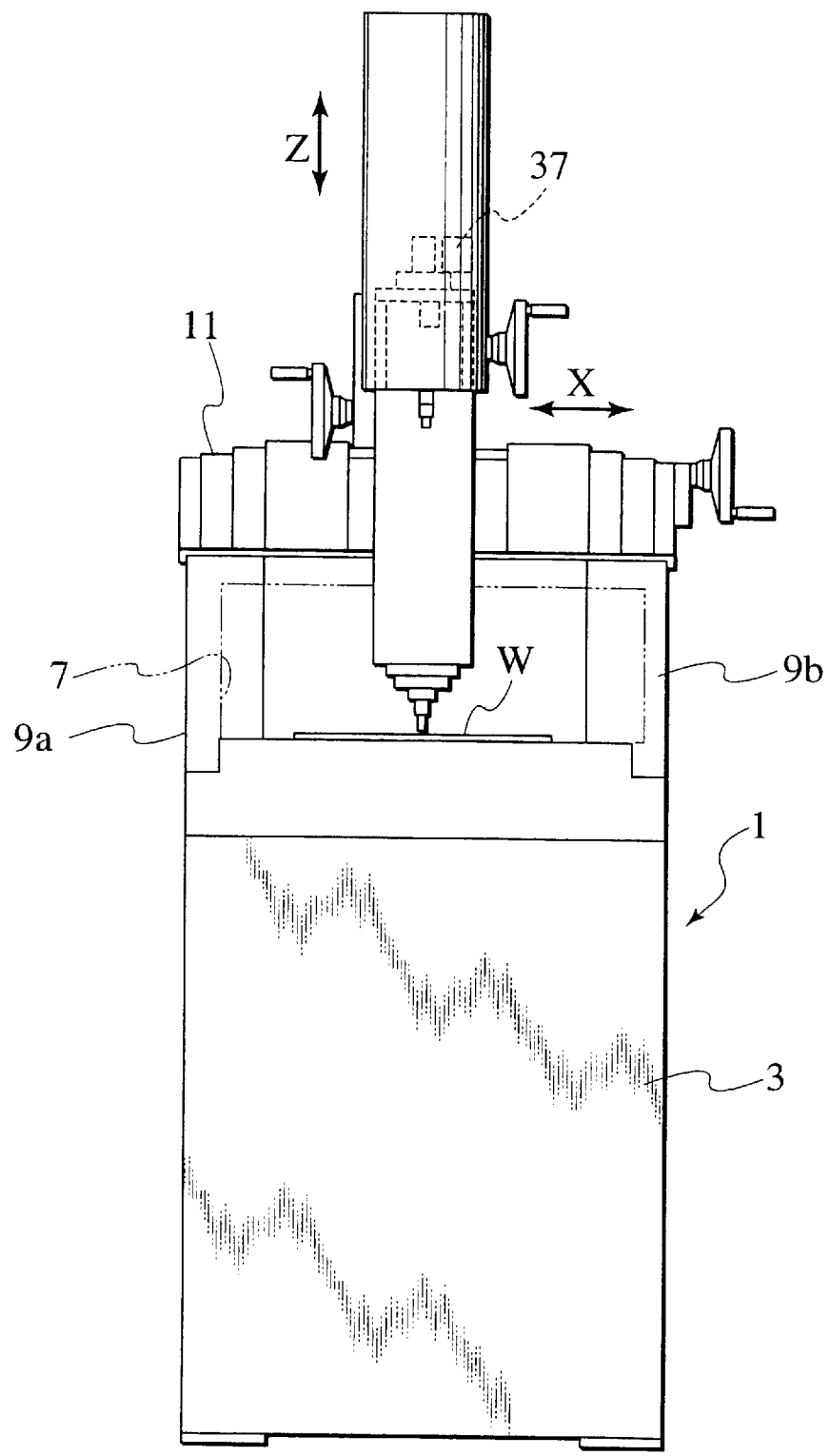
FIG. 3 is a front view of a small hole electrical discharge machining apparatus according to the present invention.
Figure 4:
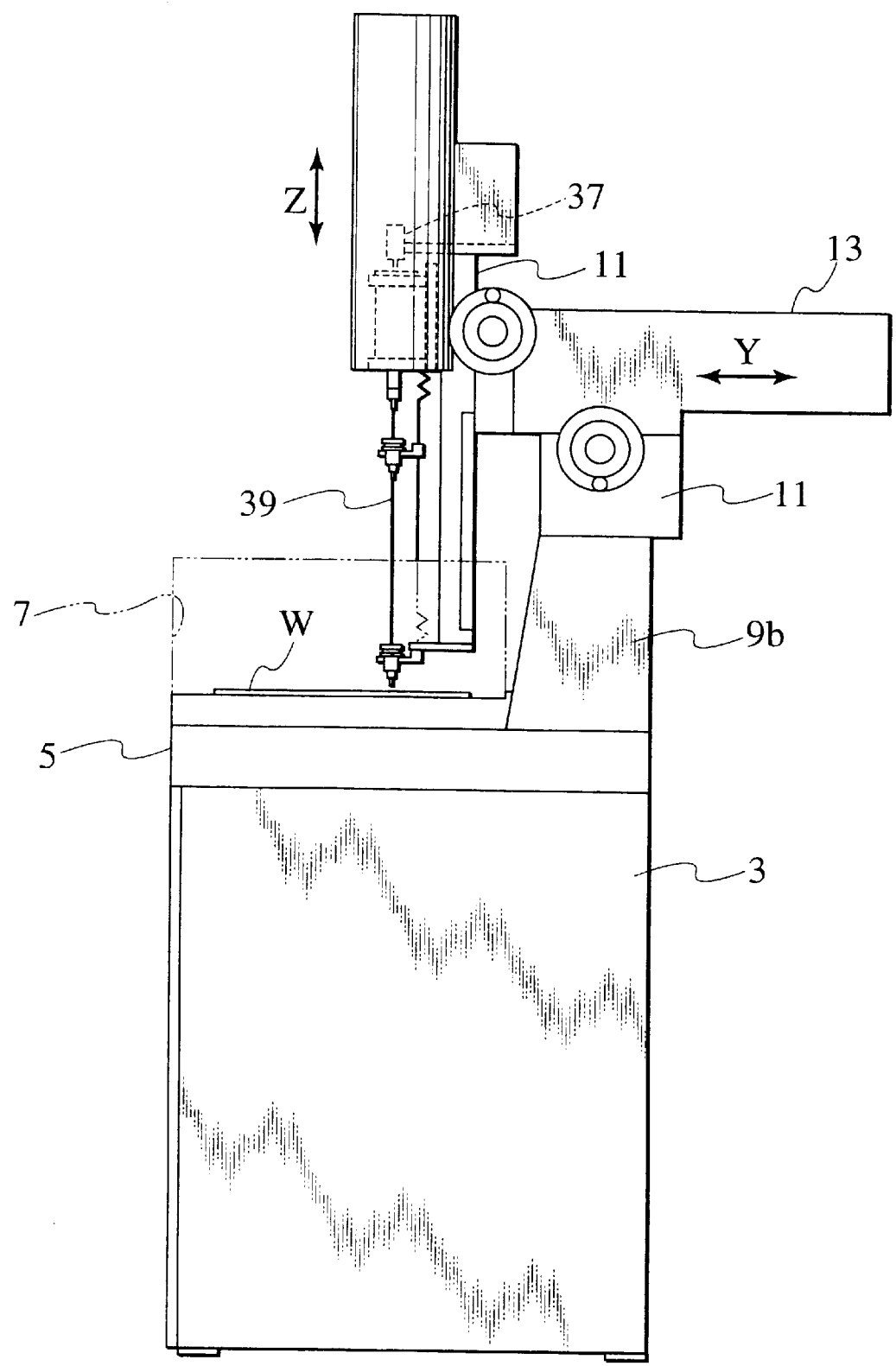
FIG. 4 is a right side view of the small hole electrical discharge machining apparatus according to the present invention.

FIGS. 3 and 4 are a front view and a side view of a small hole electrical discharge machining apparatus according to the present invention, respectively. A worktable 5 for fixing a work W thereon is provided on a pedestal 3 of a small hole electrical discharge machining apparatus 1. On the worktable 5, a processing vat 7 for accommodating the work W therein is provided. Moreover, on the rear side of the worktable 5 (right side in FIG. 4), columns 9a and 9b extending upward from the worktable 5 are provided.

On the above-described columns 9a and 9b, an X axis carriage 11 freely movable and positionable in an X direction (right-and-left direction in FIG. 3) is provided. Moreover, on the X axis carriage 11, a Y axis carriage 13 freely movable and positionable in a Y direction perpendicular to the X direction is provided.

Figure 5:
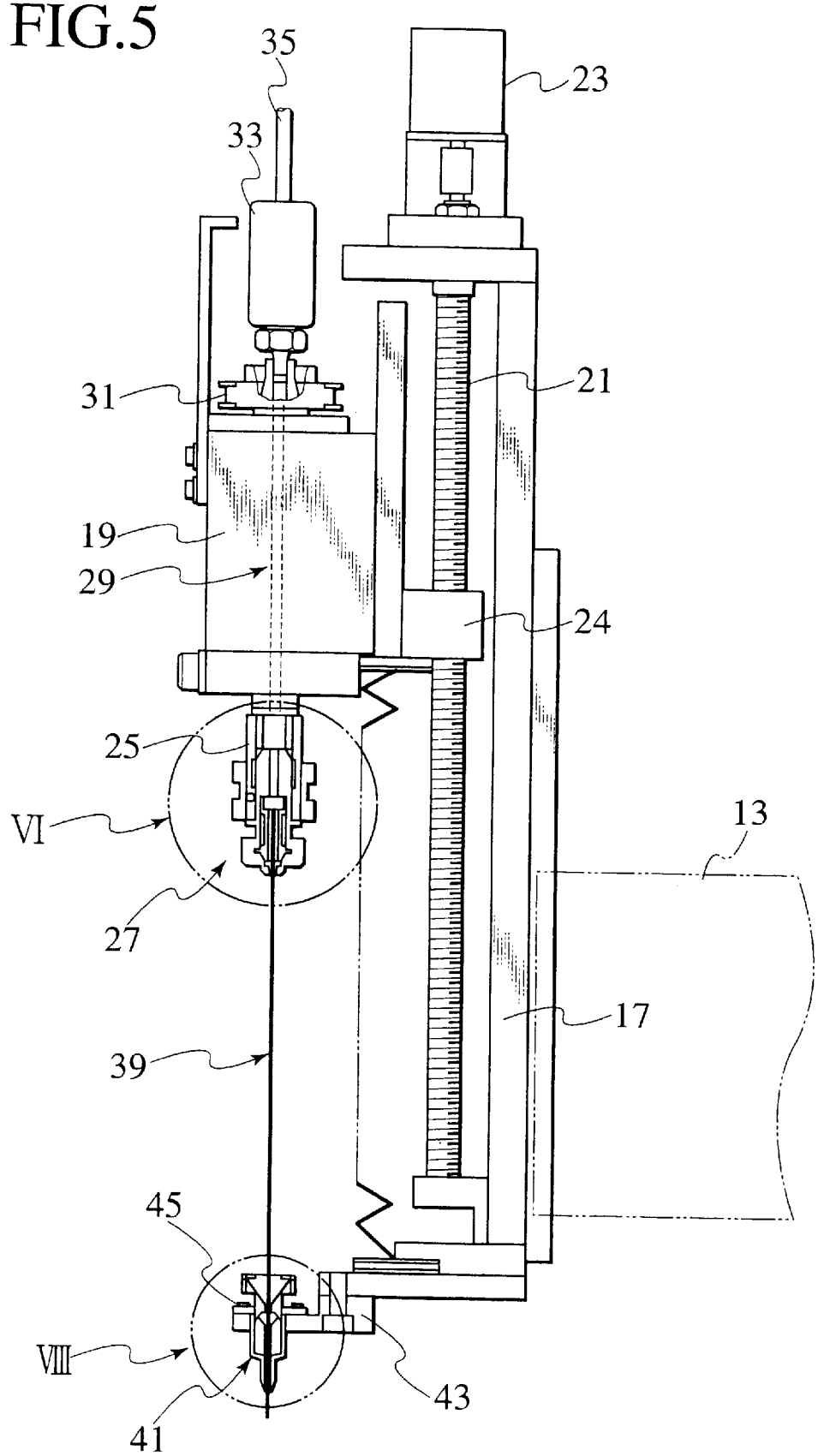
FIG. 5 is an enlarged view of a Z axis slide portion in FIG. 4.

With reference to FIG. 4, a slide base 17 is engaged with a front end (left-side end in FIG. 4) of the above-described Y-axis carriage 13 so as to be vertically movable. With reference to FIG. 5, a Z axis slide 19 is engaged with the slide base 17 by an unillustrated guide so as to be freely movable vertically.

A shaft of a Z axis feed screw 21 extending in a Z direction is supported on the slide base 17 so as to be freely rotatable. On an upper end of the Z axis feed screw 21, a servomotor 23 for rotatively driving the Z axis feed screw 21 is provided. Moreover, a nut 24 fitted to the Z axis slide 19 is screwed to the Z axis feed screw 21.

Hence, the Z axis feed screw 21 is rotatively driven in an appropriate manner by the above-described servomotor 23 under control of an unillustrated control device, whereby the Z axis slide 19 can be moved to a desired position in the Z direction.

On a lower portion of the above-described Z axis slide 19, an electrode holding member 27 provided with a one-touch coupler 25 is provided so as to be freely rotatable. Moreover, to the electrode holding member 27, a hollow rotation shaft 29 extending to the upper portion of the Z axis slide 19 is fixed with the one-touch coupler 25 interposed therebetween. On the upper end of the rotation shaft 29, a pulley 31 such as a timing pulley for driving a rotation shaft is provided. Moreover, the upper end of the hollow rotation shaft 29 is coupled to an unillustrated water supply device via a pipeline 35 with a rotary joint 33 interposed therebetween. Moreover, the pulley 31 is coupled to a drive pulley (not shown) provided in the electrode motor 37 for rotating an electrode via a drive belt (not shown).

Hence, water supplied from the water supply device will be supplied through a hollow portion of the hollow rotation shaft 29 to the electrode holding member 27. Moreover, the electrode holding member 27 can be rotatively driven by the electrode motor 37 for rotating the electrode.

Below the electrode holding member 27, an electrode guiding member 41 for guiding a tip of a stick-shaped or pipe-shaped electrode 39 is provided. The electrode guiding member 41 is fixed to a support plate 43 provided integrally on the lower end of the slide base 17 by a fastening member 45 such as a bolt.

For example, even a stick-shaped or a pipe-shaped electrode having a fine line diameter of about 0.030 mm to 0.200 mm can be fed to the electrode guiding member without being bent by a reaction force due to friction between the electrode and the above-described electrode guide.

Figure 6:
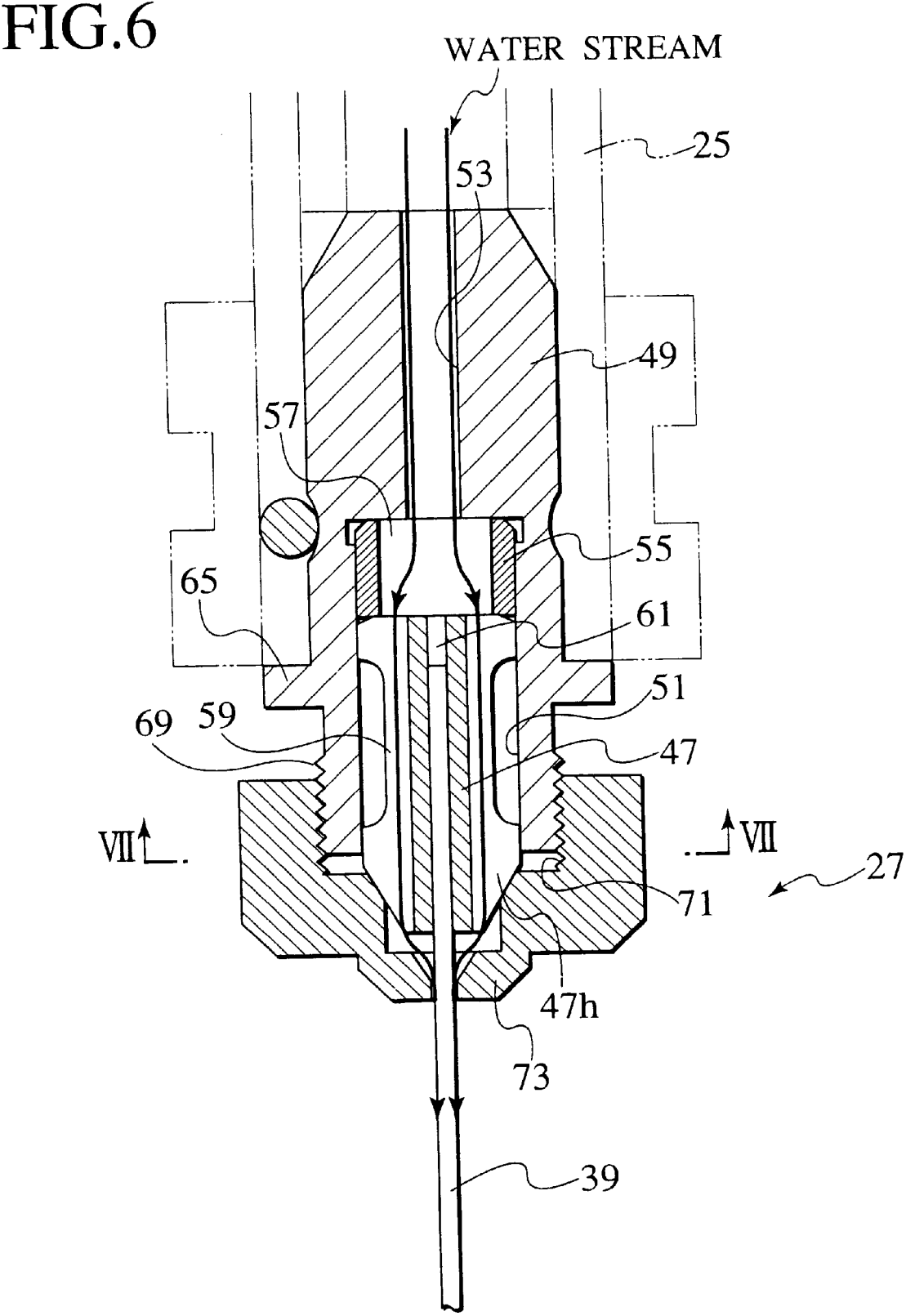
FIG. 6 is an enlarged explanatory view of a portion VI in FIG. 5.

As shown in FIG. 6, the electrode holding member 27 includes a collet 47 for holding the end of the fine stick-shaped or pipe-shaped electrode 39. The collet 47 is detachably inserted into a collet holding hole 51 open downward, which is provided in a collet holder 49 for holding the collet 47. Moreover, in the collet holding hole 51, a water path 53 communicating with a hollow hole of the rotation shaft 29 is provided.

Between the upper portion of the collet holding hole 51 and the collet 47, a ring spacer 55 having an approximately equal diameter to that of the collet 47 is inserted. Moreover, inside the ring spacer, a reserve chamber 57 for reserving water from the water path 53 is defined.

Figure 7:
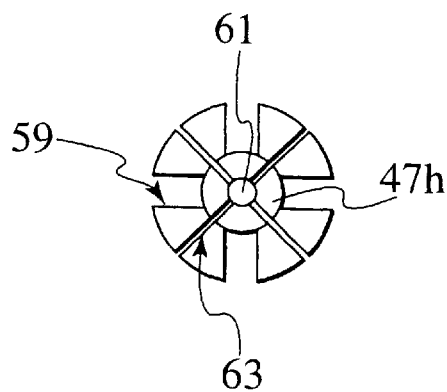
FIG. 7 is a sectional view of a collet in FIG. 6, taken along a line VII—VII.

As shown in FIGS. 6 and 7, on an outer circumference of the collet 47, four water grooves 59 communicating with a tip 47h of the collet 47 and the reserve chamber 57 are provided.

Note that, in the tip 47h of the collet 47, cross-shaped cut grooves 63 reaching a chuck hole 61 of the collet 47 is provided so that the tip 47h can be elastically deformed readily. Moreover, on a lower outer circumference of the collet holder 49, a talon-shaped engaging portion 65 abutting on the lower end of the one-touch coupler 25 is provided.

On the lower end of the collet holder 49, a collet fixing member 67 that is engaged with a tapered portion of the tip of the collet 47 and tightens the collet 47 is provided. The collet fixing member 67 includes a female screw 71 screwed to a male screw 69 in the lower end of the collet holder 49. The collet fixing member 67 is rotated, thus making it possible to release or fix the collet 47.

Moreover, in the above-described collet fixing member 67, a jet nozzle 73 is provided, which turns water flown out downward from the four water grooves 59 of the collet 47 into a water jet WJ and injects the water jet WJ so that the water can surround the stick-shaped or pipe-shaped electrode 39.

Figure 8:
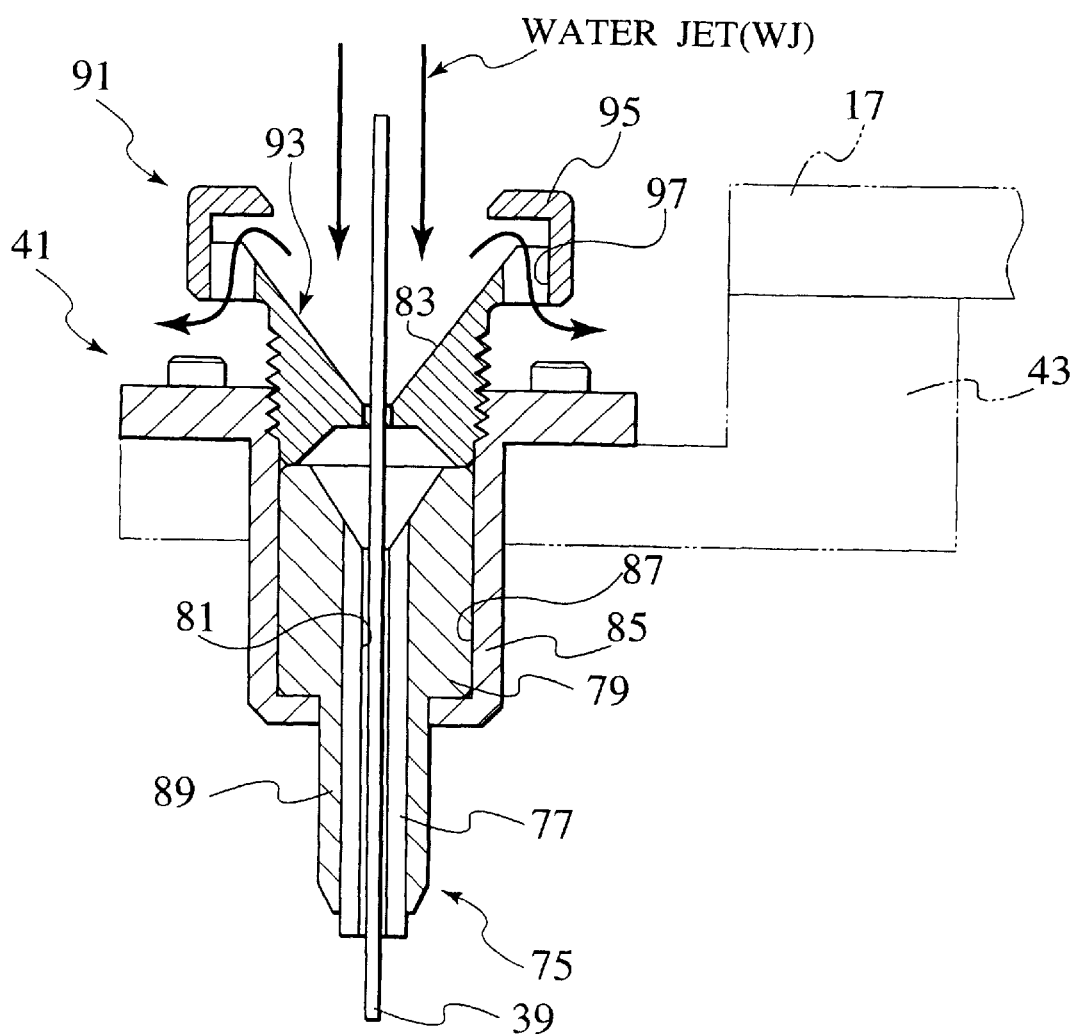
FIG. 8 is an enlarged explanatory view of a portion VIII in FIG. 5.

Meanwhile, as shown in FIG. 8, in the electrode guiding member 41, a guide unit 75 for vertically guiding the lower end of the stick-shaped or pipe-shaped electrode 39 attached to the electrode holding member 27 is provided. The guide unit 75 is fabricated by forcibly inserting an electrode guide 77 made of ceramics into a support 79 made of a material having high tenacity (e.g., metal). In the guide unit 75, a weak point of the ceramics is supplemented, in that the ceramics is frangible though the ceramics has high abrasion resistance.

Moreover, in the upper portion of the above-described guide unit 75, a funnel portion 83 for collecting a water stream into a guide hole 81 is provided. Note that an outer diameter of the upper portion of the guide unit 75 is set to be somewhat larger than that of the lower portion thereof.

The above-described guide unit 75 is attached to a guide holder 85 so that a step portion of the guide unit 75 is allowed to abut on the bottom of an attachment hole 87 of the guide holder 85 and that a small diameter portion 89 can protrude from a small hole of the bottom of the guide holder 85.

Moreover, on an upper portion of the guide unit 75, a splash preventing member 91 for preventing splash of the water jet WJ on the periphery is provided so as to be detached from the guide holder 85.

The splash preventing member 91 includes a funnel 93 for guiding the water jet WJ to the center of the guide unit 75 and a cover 95 for turning downward the water splashing upward on the funnel 93. Moreover, in the cover 95, a plurality of drain holes 97 for draining the water reflected on the upper portion of the cover are provided.

In order to attach the splash preventing member 91 to the guide holder 85, a female screw is provided on the upper portion of the attachment hole 87 of the guide holder 85, and a male screw. screwed to the female screw is provided on an outer circumference of the funnel 93. Hence, the guide unit 75 can be fixed with pressure to the guide holder 85 simultaneously when the splash preventing member 91 is screwed to the guide holder 85.

Note that the above-described guide holder 85 is fitted to the support plate 43 provided integrally with the slide base 17. Moreover, for the fluid for guiding the stick-shaped or pipe-shaped electrode 39, processed oil for use in the electrical discharge machining can be also used.

In the case where the small hole is subjected to electrical discharge machining in the electrical discharge machining device constituted as described above, when the upper portion of the stick-shaped or pipe-shaped electrode 39 is attached to the collet 47 of the electrode holding member 27, and water is fed from the water supply device to the electrode holding member 27, then the water passes through the reserve chamber 57 of the electrode holding member 27 and the water grooves on the outer circumference of the collet 47, and the water jet surrounding the circumference of the electrode is injected from the jet nozzle 73. Thus, it is made possible to straightly guide the stick-shaped or pipe-shaped electrode 39 from the electrode holding member to the electrode guiding member 41.

Moreover, since the electrode is surrounded by the water jet, flexure (jump rope phenomenon) of the electrode generated due to the rotation of the electrode can be suppressed, and high-precision small hole machining can be carried out. In addition, fusion cutting of the electrode due to heating caused by the electrical discharge machining can be prevented.

Note that, since a thin and long stick-shaped electrode can be used, for which fabrication of an electrode tip thereof is not required, productivity in the small hole electrical discharge machining can be improved. In this embodiment, machining can be carried out under conditions where the line diameter of the electrode is 0.070 mm and the length thereof is about 220 mm.

What is claimed is:

1. An electrical discharge machining method for a small hole electrical discharge machining apparatus including an electrode holding member for holding an upper portion of a stick-shaped or pipe-shaped electrode, an electrode guiding member for guiding a lower portion of the electrode, and a jet nozzle for generating a water jet in the electrode holding member, and a splash preventing member for preventing splashing of the water jet, the electrical discharge method comprising:

guiding the electrode by use of the water jet; and feeding the electrode to a work while rotating the electrode simultaneously with said guiding.

2. A small hole electrical discharge machining apparatus, comprising:

a slide base;

a Z axis slide freely positionable in a vertical direction, said Z axis slide provided on said slide base;

an electrode holding member for holding an upper portion of a stick-shaped or pipe-shaped electrode, said electrode holding member provided on said Z axis slide to be freely rotatable;

an electrode guiding member for guiding a lower portion of said electrode, said electrode guiding member provided on said slide base;

an electrode motor for rotatively driving said electrode holding member, said electrode motor provided on said Z axis slide;

a jet nozzle configured to guide the electrode by a water jet, said jet nozzle provided on said electrode holding member; and a splash preventing member configured to prevent splashing of the water jet.

3. The small hole electrical discharge machining apparatus according to claim 2, wherein said electrode guiding member comprises:

a guide unit provided with an electrode guide made of ceramics; and a funnel for guiding said water jet to a center of said guide unit.

4. The small hole electrical discharge machining apparatus according to claim 3, wherein said splash preventing member comprises
        a cover, and
        a plurality of drain ports provided in the cover, and
        the cover guides downward water splashing on said funnel, and water reflected on an upper portion of the cover is drained through the drain ports.

5. The small hole electrical discharge machining apparatus according to claim 3.

wherein said splash preventing member comprises a male screw provided therein, and the male screw is screwed to a female screw provided in said guide unit.

* * * * *